US007980654B2

(12) United States Patent
Mongeon et al.

(10) Patent No.: US 7,980,654 B2
(45) Date of Patent: Jul. 19, 2011

(54) SENSOR CALIBRATION FOR ROBUST CROSS-PROCESS REGISTRATION MEASUREMENT

(75) Inventors: Michael C. Mongeon, Walworth, NY (US); Howard Mizes, Pittsford, NY (US); Helen Shin, Fairport, NY (US); Kenneth R. Ossman, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 57 days.

(21) Appl. No.: 12/482,030

(22) Filed: Jun. 10, 2009

(65) Prior Publication Data

US 2010/0315461 A1 Dec. 16, 2010

(51) Int. Cl.
*B41J 29/393* (2006.01)
*H04N 1/46* (2006.01)

(52) U.S. Cl. ................ 347/19; 347/15; 347/41; 347/42; 347/251; 358/501; 358/504

(58) Field of Classification Search .................... 347/19, 347/15, 41–42, 251; 358/501, 504
See application file for complete search history.

(56) References Cited

U.S. PATENT DOCUMENTS

| | | | | |
|---|---|---|---|---|
| 5,508,826 | A * | 4/1996 | Lloyd et al. | 358/501 |
| 6,494,558 | B1 * | 12/2002 | Doval et al. | 347/19 |
| 6,623,096 | B1 * | 9/2003 | Castano et al. | 347/19 |
| 7,090,324 | B2 * | 8/2006 | Mizes | 347/19 |
| 7,125,094 | B2 * | 10/2006 | Mizes | 347/19 |
| 7,154,110 | B2 * | 12/2006 | Mizes et al. | 250/559.1 |
| 7,289,248 | B2 * | 10/2007 | Yamazaki | 347/19 |
| 7,347,525 | B2 * | 3/2008 | Mizes | 347/19 |
| 7,387,357 | B2 * | 6/2008 | Toh et al. | 347/19 |
| 7,552,986 | B2 * | 6/2009 | Mizes et al. | 347/19 |
| 2005/0052494 | A1 * | 3/2005 | Takahashi et al. | 347/41 |

* cited by examiner

*Primary Examiner* — Ryan Lepisoto
*Assistant Examiner* — Guy G Anderson
(74) *Attorney, Agent, or Firm* — Oliff & Berridge, PLC

(57) ABSTRACT

Systems and methods are provided for calibrating a sensory array to ensure a robust cross-process registration measurement. The calibration is implemented using a calibration step that determines the signature error amount of a given image reading sensor. The signature error amount for the sensor is stored in a signature error look-up table. When the sensors are used to sense print head alignment, the correction may be implemented by accessing the signature error look-up table for the given sensor when calibrating the print heads. The signature error look-up table provides an amount of offset for each sensor that is used in determining the appropriate head position of a given print head to calibrate the print heads for the signature error associated with the given sensor.

18 Claims, 9 Drawing Sheets

SENSOR CALIBRATION FOR ROBUST CROSS-PROCESS REGISTRATION MEASUREMENT

BACKGROUND

This disclosure relates to sensor calibration methods for providing robust cross-process registration measurement, and more specifically relates to calibrating individual sensors to ensure a more robust cross-process registration of print heads in a color printing system.

Most printing systems now have the ability to calibrate print head positions to determine the proper alignment of each print head. In a typical print head calibration system, a test pattern is printed and an image-reading sensor reads the pattern and analyzes the response. The test pattern can consist of a series of dashes or printed out bars and the sensors can be any type of image-reading sensor. After the system reads in the test pattern, the system analyzes the pattern to determine if a print head is misaligned based upon the position of the printed pixel compared to the ideal position that the pixel should have been printed at.

In certain solid ink architecture printing systems, full width array image sensors are used, for example, to register a population of print heads in a color printing system. The full width array image sensors are comprised of a series of chips butted together to form the required process width of a given image. These sensors determine the average position of each print head.

SUMMARY

A repeatable problem occurs, however, when the full width array sensors read the printed test pattern. Specifically, each full width array sensor typically has been found to have a signature error occurring in the cross process direction of ±20 μm. The errors are unique to each full width array sensor and repeat over the scanning of a particular test pattern. For example, the sensor may be a 600 dpi image sensor array formed from 32 chips butted together and bonded to form an array of a length to match or exceed the cross-process width of the print head array. Because of the multiple units and bondings, errors may be introduced in the sensor array itself. As such, this full width array sensor signature error affects the calibration of each print head. It should be noted that the bulk of the signature error is optically induced having additional chip gap effect.

One possible solution for accounting for this signature error is to modify the printed test pattern. Specifically, the control and algorithm for the test patterns can be modified to minimize the signature effect. However, this process increases the overall financial cost and/or the overall time cost.

U.S. Pat. No. 7,154,110, hereby incorporated by reference, describes an image reading sensor calibration process that uses sensor signature look-up tables to account for sensor signature error. U.S. Pat. No. 7,154,110 describes a calibration process where multiple test patterns having random line patterns are measured by an image reading sensor. The test patterns are sampled multiple times at multiple x-positions as the system processes in the cross-process direction. The test patterns used in U.S. Pat. No. 7,154,110 are from lower cost printers. U.S. Pat. No. 7,154,110 determines sensor error by solving an over-determined matrix equation using relative positions of neighboring lines. However, the techniques of U.S. Pat. No. 7,154,110 are time consuming and not very cost effective because of the repeated calibration of the image reading sensors as they are sampled multiple times at multiple x-positions over the test patterns.

In order to address the drawbacks to the above-described calibration apparatus, a system and method for calibrating sensors for robust cross-process registration measurement are provided. The system and method provides a correction process in which the system may provide a registration target consisting of a series of bar patterns, the location of the bar patterns are determined, and the corrected position is determined by subtracting the positional error from the measured position. In exemplary embodiments, the test pattern is a high quality lithographic test pattern that helps calibrate the image reading sensors. The image reading sensors sample the test pattern once to determine the sensor signature error in each individual sensor. In an exemplary embodiment, sensor calibration is performed offline on a bench using a stationary sensor. It should also be appreciated that in an exemplary embodiment, an absolute measurement technique is used to determine the sensor error by subtracting the intended position of the sensor from the actual measured position. The absolute measurement technique is advantageous over previous technology because it reduces the time spent calibrating the sensors and the overall cost associated for calibrating each sensor.

In accordance with various aspects of the disclosure, a method for calibrating print heads to account for signature error of an image reading sensor, comprises the steps of providing a first test pattern having a series of bars, the bars having known centroid locations; reading each bar of the first test pattern using the image reading sensor; computing the centroid location of each bar pattern using the sensor; calculating the signature error of each image reading sensor by comparing the sensor read centroid location to the corresponding known centroid location; and creating a signature error look-up table containing the signature error for each individual sensor at N pixel intervals.

In other aspects of the disclosure, there is a printing apparatus, comprising a test pattern providing device that provides a first test pattern having a series of bars, the bars having known centroid locations; an image reading sensor that reads each bar of the first test pattern and computes a centroid location of each bar pattern; a signature error calculation part that calculates the signature error of each image reading sensor by comparing the sensor read centroid location to the corresponding known centroid location; and a signature error look-up table containing the signature error for each individual sensor at N pixel intervals.

These and other features and advantages of this disclosure are described in, or apparent from, the following detailed description of various exemplary embodiments of the systems and methods according to this disclosure.

BRIEF DESCRIPTION OF THE DRAWINGS

Various exemplary details of systems and methods are described, with reference to the following figures, wherein.

DETAILED DESCRIPTION OF THE EMBODIMENTS

Figure 1:
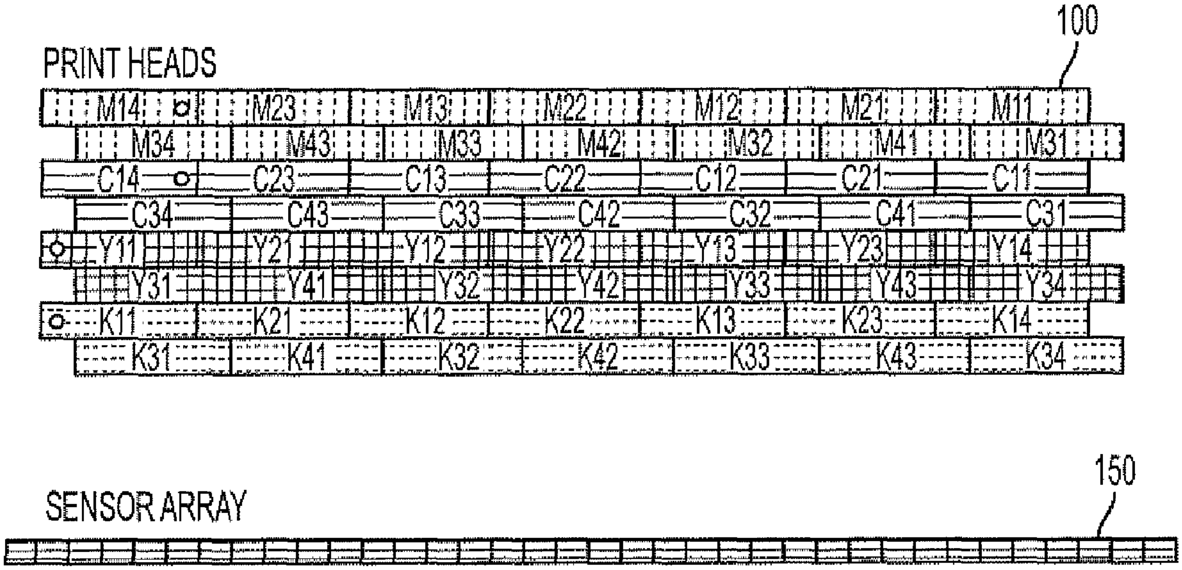
FIG. 1 illustrates an exemplary architecture for an arrangement of CMYK print heads in a printing apparatus.

FIG. 1 is an exemplary architecture for an arrangement of CMYK print heads within a printing apparatus. In an exemplary embodiment, print head arrangement 100 is a solid ink architecture. Although not limited to a specific configuration or dot pitch, each row may contain seven print head units that are stitched together from left to right to produce a certain DPI image of a given length, such as a 300 DPI image. In this example, each print head unit has a length of about 3 inches, with an array of 880 jets in each forming a combined process width of over 20 inches at the given DPI. Thus, each jet has a spacing of approximately $1/300^{th}$ of an inch. For each color CMYK, the top and bottom rows may be interlaced together to produce a 600 DPI image as known. The head position for each particular print head unit may be tightly controlled using stepper motors to account for process direction (Y-axis), cross-process direction (x-axis), and roll (rotation fine adjustment).

As can be seen in FIG. 1, the print heads are labeled based on their particular color, unit number, and head number. For example, M14 refers to magenta, unit 1, head 4. As such, unit 1 will have at least 4 total heads. As can be seen in FIG. 1, M14 is tied to M13, M12, and M11. This arrangement applies for the remaining colors, cyan, yellow, and black.

Although not limiting to this particular embodiment, it should be noted that the process direction is the direction in which the paper is moving (i.e. processing) along the course of printing. In a standard printing device, the paper moves along what most would traditionally consider the y-axis. As such, the process direction refers to movement of the paper along the y-axis. A direction perpendicular to the process direction is referred to as the cross-process direction. In this embodiment, the cross-process direction is along the x-axis and corresponds to a longitudinal axis of the print heads.

A particular calibration sensor 150, such as a full width sensor array formed from an array of butted sensor chips, is provided to sense alignment of the print head 100. The chips may be butted together in sufficient quantity to extend at least as wide as the print head array, as shown.

Figure 2:
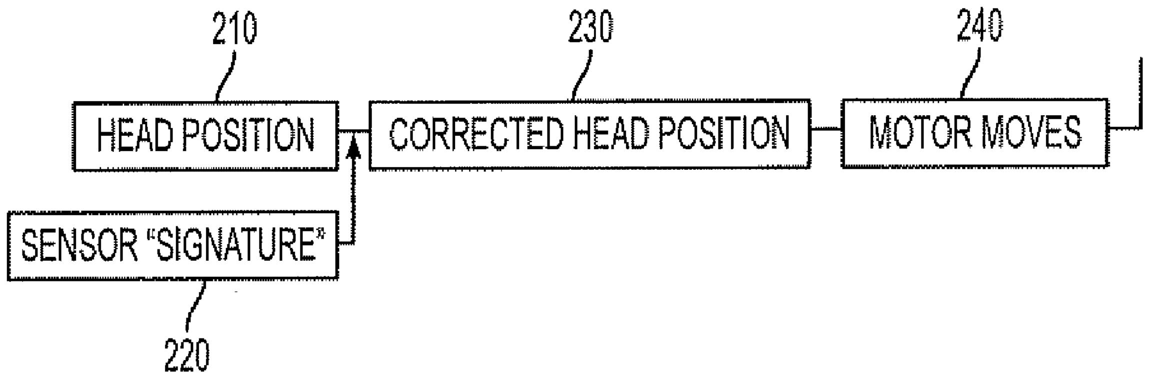
FIG. 2 illustrates an exemplary analysis and control flow diagram for improving the measurement of print head positions that takes into account a sensor signature.

FIG. 2 is an exemplary embodiment of an analysis and control diagram of a process for improving print head positioning. Head position 210 is the normal sensor calibration measurement for a particular print head. Sensor signature 220 refers to a specific profile for a particular sensor, used to obtain print head alignment, that may include a repeatable error component. This "signature" is obtained and used to derive a corrected head position 230. The corrected head position 230 will affect x-position (cross-process position), y-position (process position), and roll (i.e. rotation) of a particular print head. Once the corrected head position 230 is determined, motor move commands 240 may be sent to the particular print head to more accurately control printing by accounting for "signature" error in the detection of print head alignment by the particular sensor.

Figure 3:
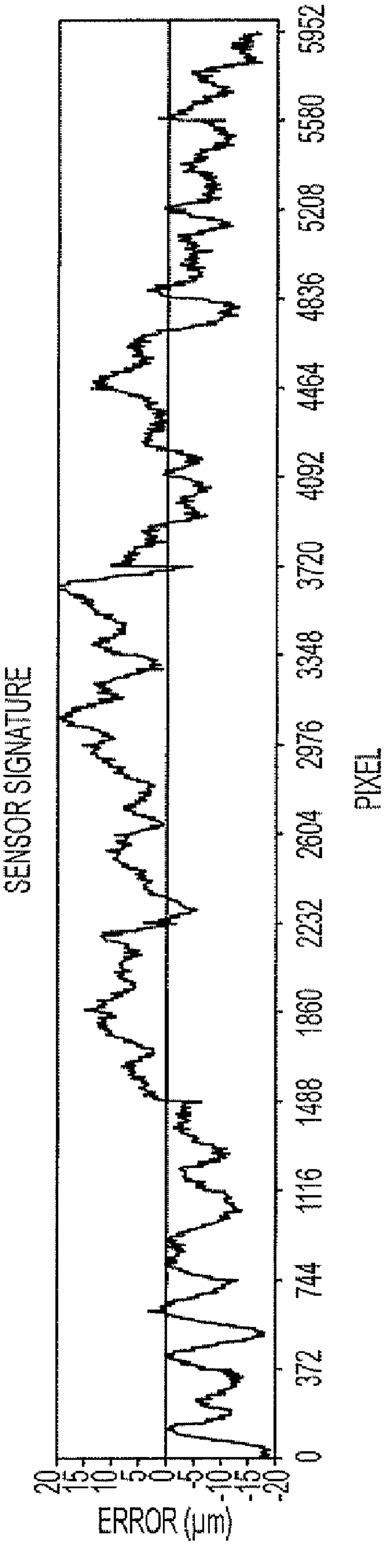
FIG. 3 illustrates an example of repeatable sensor position error (in μms) representing the sensor error signature of a given sensor.

FIG. 3 is an illustration of the repeatable sensor position error in μm representing the sensor signature of a given sensor. As can be seen in FIG. 3, a given sensor can have a signature error ranging from ±20 μm. This repeatable error can be significant when calibrating the misalignment of a particular print head. FIG. 3 displays a graphical representation of the sensor signature error at each individual pixel (smallest identifiable sensor element). As shown in FIG. 3, the exemplary sensor array has 5952 pixels.

Figure 4A:
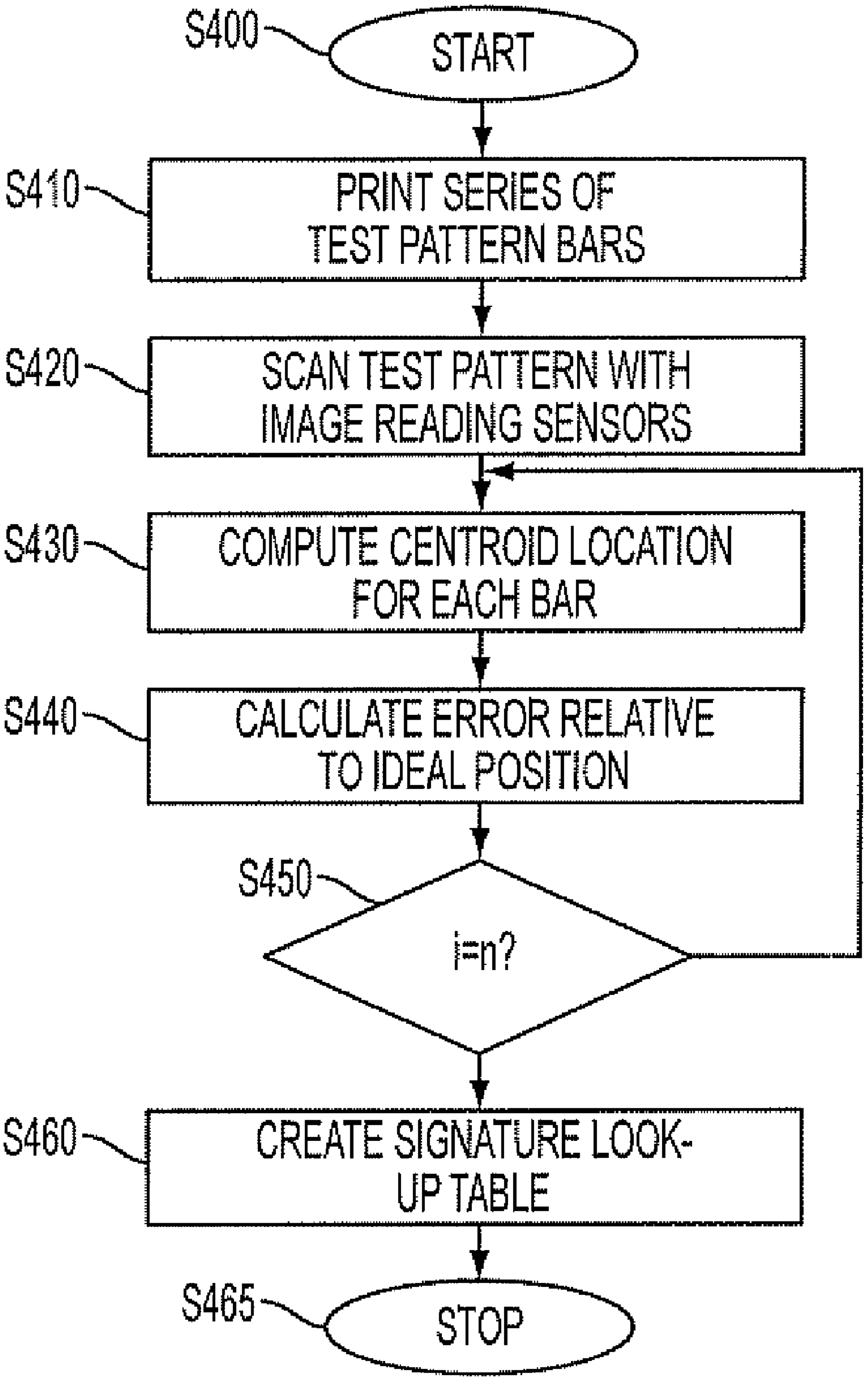
FIG. 4A illustrates a flowchart outlining an embodiment of a method for characterizing image-reading sensors to provide robust cross-process registration measurement in accordance with aspects of the disclosure.
Figure 6:
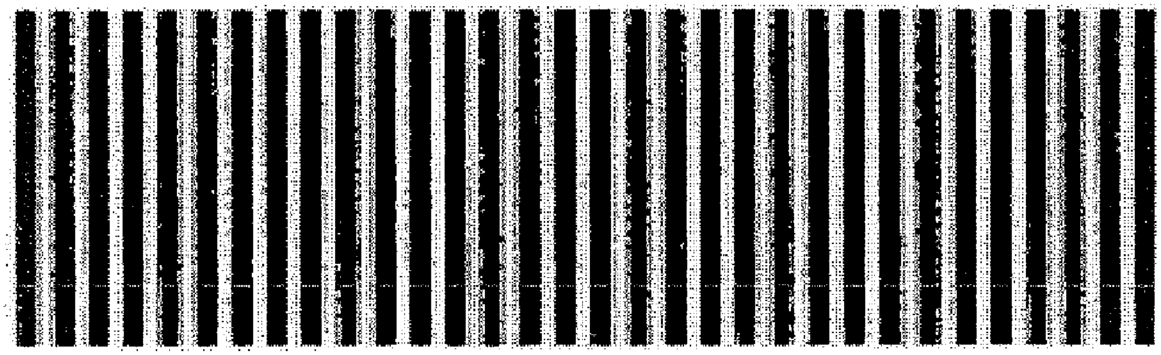
FIG. 6 illustrates an example of an exemplary ladder chart test pattern to be read in by a sensor array.

FIG. 4A is a flowchart outlining an embodiment of a method for calibrating sensors to provide robust cross-process registration measurement. In one embodiment, the image-reading sensors can be calibrated or characterized in a factory prior to the sensors being placed into the image-forming device. As shown in FIG. 4A, the process of the method starts at step S400 and proceeds to step S410 where the system begins its sensor calibration process to find the sensor signature. In step S410, a test pattern consisting of, for example, ladder charts is provided for a known period. As can be seen in FIG. 6, the ladder chart test pattern has alternating levels of light and dark images spaced out over a fixed distance. In an exemplary embodiment, the test pattern is a precise lithographic test pattern consisting of a ladder chart. The pattern is considered a ladder chart because the light periods represent an "off" location in the image where the dark steps represent an "on" location in the image, similar to an alternating square wave graph pattern. For a four color print head, the pattern would include CMYK pattern components. As mentioned above, the alternating light and dark patterns are spaced apart at a fixed distance. For example, the system can provide a 5 cycle/mm ladder chart which would have a period of 200 μm for each alternating light and dark portion. This results in spacing between light and dark images of 200 μm.

After the ladder chart test pattern has been provided, the system will proceed to step S420 and use the array of calibration sensors to capture the test pattern across the length of the sensor array bar. Although not limited to this embodiment, the sensor array may be a full width array sensor consisting of a series of chips butted together to form a certain process width of sensor elements of a given resolution (DPI). In exemplary embodiments, the scan line average of the test pattern image results in a 1-D gray level profile across the sensor array.

For each ladder, the system will perform an iteration of steps characterized in steps S430 to S450. Steps 8430 to S450 are performed as a loop for i=1 to n iterations. Starting with the first ladder (i=1), the system will compute the centroid location of the ladder.

In an exemplary embodiment, the centroid is calculated by providing a sample ladder chart test pattern having alternating light and dark portions creating a reflective profile. The sensors will then read the center portions between each rising and falling edge of each alternating light and dark pattern. The centroid location is the area closest to the center of either the light portion or the dark portion. In its most simple embodiment, the centroid will be the exact center portion of the light or dark portion of the ladder chart pattern. However, due to the sensor signature error of the image reading sensors, the centroid location read in by the sensor may be off by several ems. In some cases, the centroid readings were found to be off center anywhere in the range of ±20 μm.

After the system calculates the centroid position of the ladder, the system proceeds to step S440. In step S440, the system will calculate the error of the sensor relative to the ideal position of the ladder test pattern. The system calculates the error using the equation E(i)=X(i)−(i−1)*dX. E(i) is the error amount that the particular sensor is off from the ideal position. In essence, E(i) is actually the calculated signature for the particular sensor. X(i) is the position of the centroid read in by the sensor. The portion of the equation, (i−1)*dX denotes the location of the previous iteration, (i−1), times a constant dX which is the period of distance between the test bars. In an exemplary embodiment, dX is 200 μm. As such, the positional error E(i) is calculated by the actual position X(i) minus the previous iteration, (i−1), times a constant dX.

After the positional error is calculated for a particular iteration, the system will proceed to step S450. In step S450, the system will simply determine if the number of iterations has reached its finish at n. If i=n, the system will proceed to step S460. If i does not equal n, the system will go back to step S430 and increment i by a value of 1 and repeat steps S430 to S450 until i=n.

Once the system has computed the relative positional error for each sensor at every ladder position, the system will proceed to step S460. At step 8460, the system will create a signature error look-up table, SIG_LUT, that is constructed at N-pixel intervals for each image-reading sensor. As such, each image-reading sensor will know the signature error at every pixel in the sensor, and SIG_LUT will contain the sensor signatures for every sensor in the sensor array. For example, one typical full width array sensor alone may have 13392 values for the pixels in the full width array sensor. After the SIG_LUT table is constructed, the system then ends the image-reading sensor characterization process at step S465 and proceeds to perform the correction process for the print head calibration.

Figure 4B:
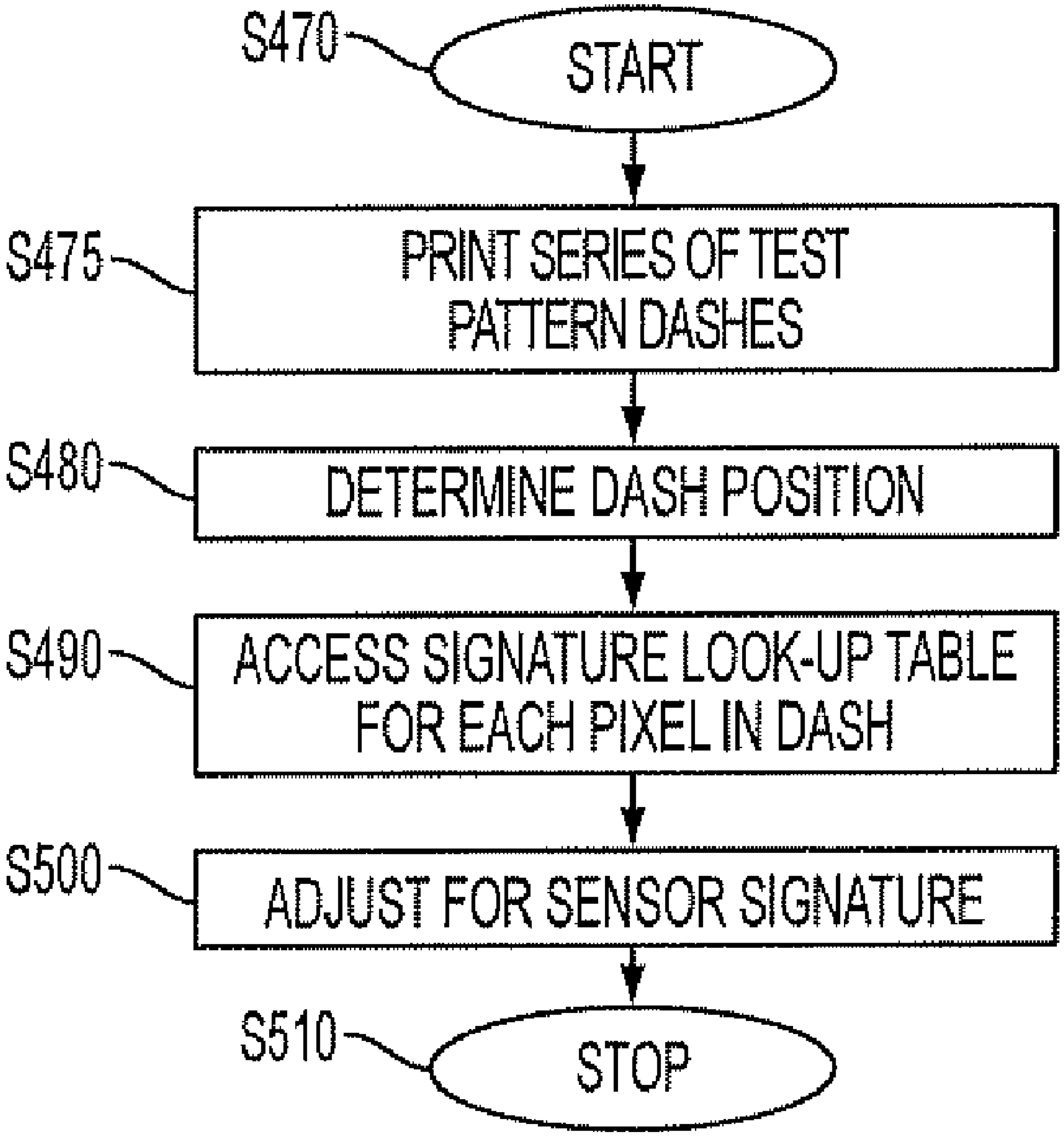
FIG. 4B illustrates a flowchart outlining an embodiment of a method for calibrating print heads in an image-forming device using a signature error look-up table in accordance with aspects of the disclosure.
Figure 7:
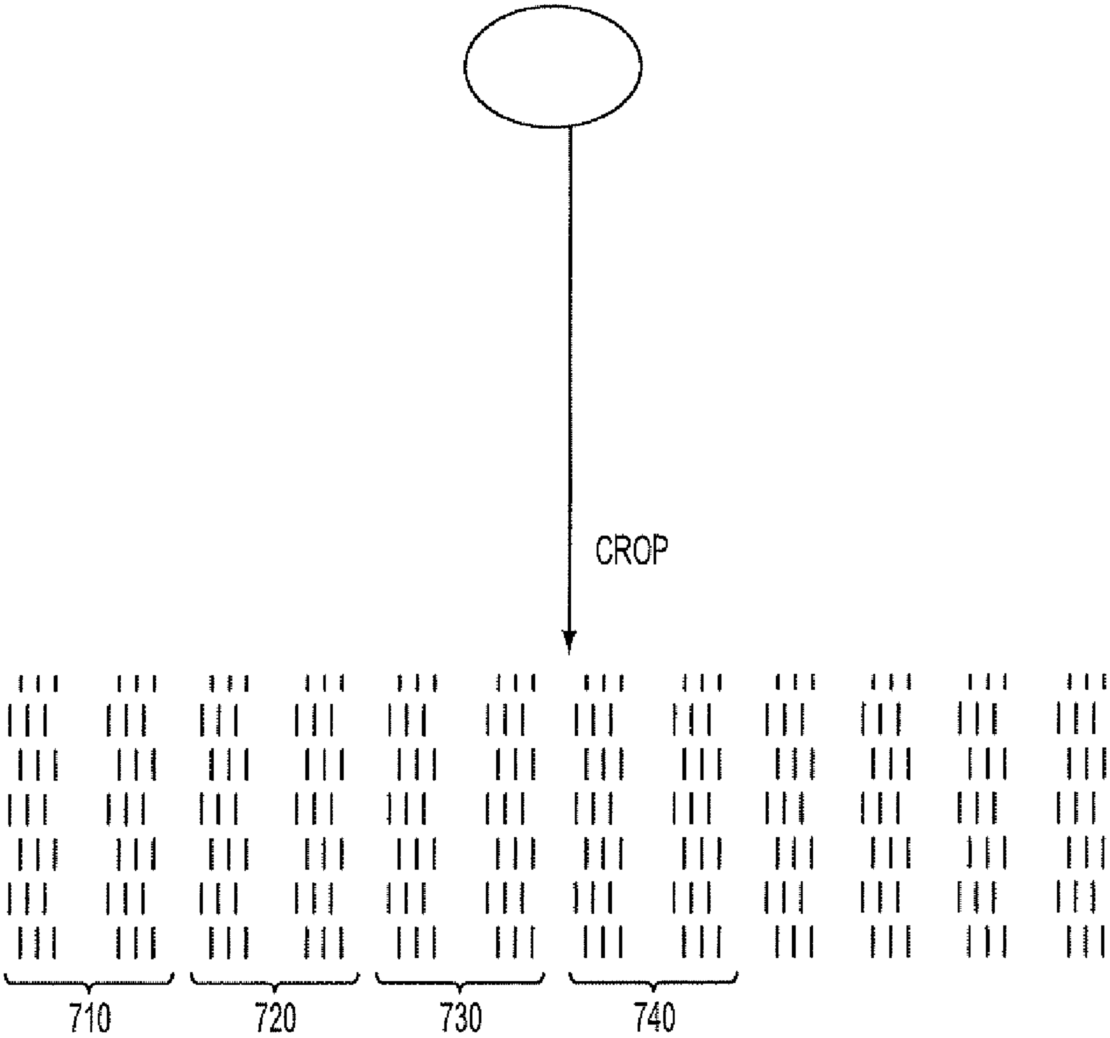
FIG. 7 illustrates an example of a printer registration test pattern.

FIG. 4B illustrates a flowchart outlining an embodiment of a method for calibrating print heads in an image-forming device using a signature error look-up table in accordance with aspects of the disclosure. After the system creates the SIG_LUT signature error look-up table, the system will begin the print head calibration at step S470. At step S475, the system will print out a test pattern consisting of a series of CMYK dashes to quantify x-direction, y-direction, and roll of the print head system. The test pattern is periodic in the cross-process direction in order to sample jets in the same row within a given print head. Printed dash pattern parameters, such as dash length and the number of repeated dashes are dependent upon sensor contrast and noise. A suitable exemplary test pattern is shown in FIG. 7 in which 7 dashes are provided in each color and a series of such patterns are provided for each color CMYK. Other considerations, such as image size and ink usage are weighed when determining the optimization of the test pattern design.

After the test pattern is printed out by each of the print heads, the system will proceed to step S480 to scan the dashes and determine the overall alignment and calibration of the individual print heads. In step S480, the image reading sensors scan each dash. For every dash scanned by the sensor, the sensor determines the x-position of the dash. The x-position in an exemplary embodiment is along the x-axis (cross-process direction) and the y-position in an exemplary embodiment is along the y-axis (process direction).

The x-position of the dash may be in fractional pixels. As such, linear interpolation of the sensor signature from the SIG_LUT look-up table may be required. For example, a sensor may read a pixel at position 74.5. However, the SIG_LUT look-up table is constructed for each pixel. Therefore, the system would have to interpolate the error at pixel 74 and at pixel 75 to determine the signature error for pixel 74.5. The x-position at a given pixel is represented by $x_{dash}$.

After the system determines $x_{dash}$ for a particular dash, the system will proceed to step S490. In step S490, the system will access SIG_LUT for each pixel, and, as explained above, in some instances using linear interpolation, will determine the amount of error of the given sensor to determine the appropriate calibration for a particular print head that takes into account the "signature" of error attributed to the image sensor itself. The amount of error at a given pixel is denoted by $e_{dash}$. The value of $e_{dash}$ is the amount in which the given sensor is misreading the pixel alignment at a particular location. In essence, it is the sensor's signature for that particular value. As such, the system can correct for the misreading of the sensor by simply adjusting for $e_{dash}$.

Once the system determines $e_{dash}$ for a given pixel, the system proceeds to step S500. At step S500, the system will adjust for the sensor's signature by offsetting $x_{dash}$ by the error value in $e_{dash}$. As such, the system will determine $x_{dash\_corrected}$ by using the equation $x_{dash\_corrected}=x_{dash}-e_{dash}$. The system can repeat steps S480 to S500 until all of the dashes in the test pattern have been read and proper alignment of the print heads is complete in which the system will proceed to step S510.

Figure 5:
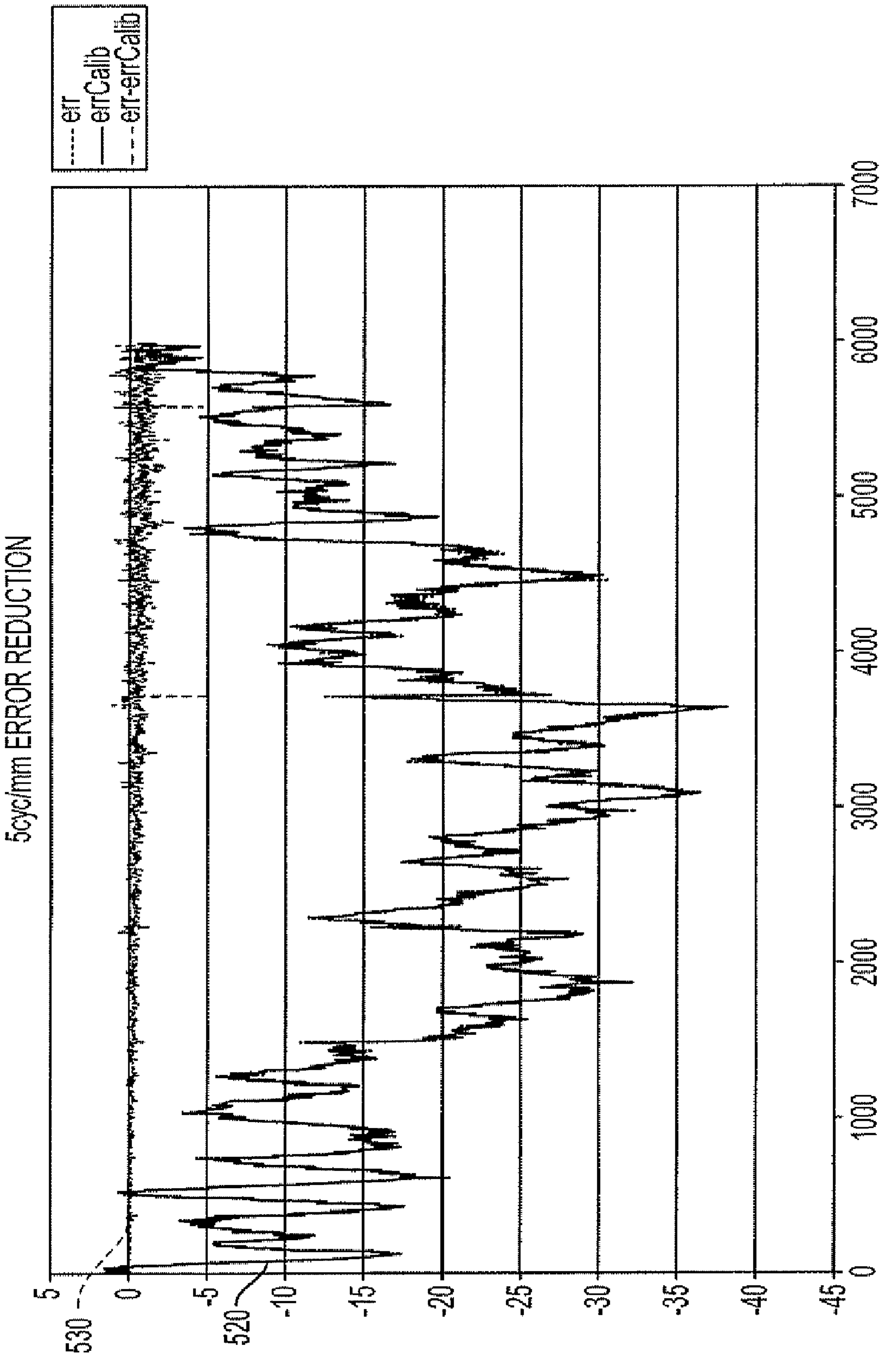
FIG. 5 illustrates an example of improved positional error correction after the method for calibrating the sensors, shown in the flowcharts of FIGS. 4A and 4B.

FIG. 5 illustrates testing results showing improved positional error correction after the method for calibrating the sensors has been performed. FIG. 5 shows both the signature error 520 and the signature error correction 530. After correction, the signature error correction 530 is very close to ±2 μm. This particular example resulted in 1/10 of the previous error amount, a 90% improvement.

FIG. 7 illustrates an example of a printer registration test pattern. As can be seen in FIG. 7, a series of dashes for each CMYK color are printed out for the system to read for determining print head alignment. Although not limited to this embodiment, the system may print out paired columns of dashed patterns as depicted by cyan pattern 710, magenta pattern 720, yellow pattern 730, and black pattern 740.

Figure 8:
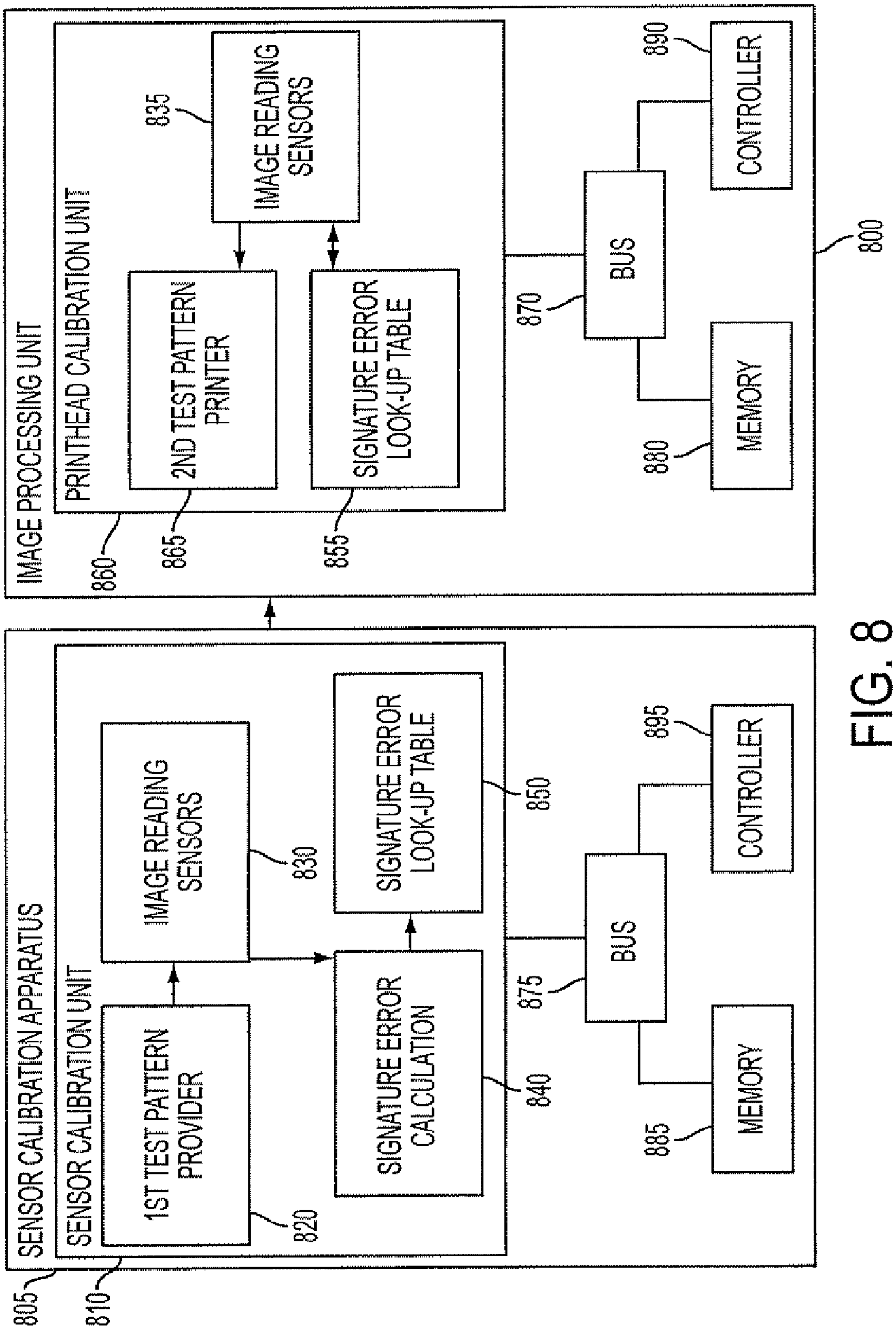
FIG. 8 illustrates a functional block diagram illustrating an exemplary embodiment of an image processing apparatus as part of a printing apparatus.

FIG. 8 is a functional block pattern illustrating an exemplary embodiment of an image processing apparatus 800 and a sensor calibration apparatus 805. Specific examples of image processing apparatus 800 include, according to the embodiments within this disclosure, a highlight printer, a duotone printer, a printer, a solid ink architecture print system, a copier, a xenographic device, a facsimile machine, or a multi-function device. These image processing apparatus can be for personal or commercial production use.

The image processing apparatus 800 includes a print head calibration unit 860, a bus 870, a memory 880, and a controller 890. In an exemplary embodiment, the print head calibration unit 860 has image reading sensors 835, a second test pattern printer 865, and a signature error look-up table 855.

The sensor calibration apparatus includes a sensor calibration unit 810, a bus 875, a memory 885, and a controller 895. In an exemplary embodiment, the sensor calibration unit 810 has a first test pattern provider 820, image reading sensors 830, a signature error calculation unit 840, and a signature error look-up table 850.

The memory 880 may serve as a buffer for information coming into or going out of the image processing apparatus 800, may store the signature error look-up table 855, may store any necessary programs and/or data for implementing the functions of the image processing apparatus 800, and/or may store data at various stages of processing. Furthermore, it should be appreciated that the memory 880, while depicted as a single entity, may actually be distributed. Alterable portions of the memory 880 are, in various exemplary embodiments, implemented using RAM. However, the memory 880 may also be implemented using disk storage, optical storage, flash memory or the like.

The memory 885 may serve as a buffer for information coming into or going out of the sensor calibration apparatus 805, may store the signature error look-up table 850, may store any necessary programs and/or data for implementing the functions of the sensor calibration apparatus 805, and/or may store data at various stages of processing. Furthermore, it should be appreciated that the memory 885, while depicted as a single entity, may actually be distributed. Alterable portions of the memory 885 are, in various exemplary embodiments, implemented using RAM. However, the memory 885 may also be implemented using disk storage, optical storage, flash memory or the like.

The controller 890 controls the operation of other components of the image processing apparatus 800, performs any necessary calculations and executes any necessary programs for implementing the process of the image processing apparatus 800 and its individual components, and controls the flow of data between other components of the image processing apparatus 800 as needed.

The controller 895 controls the operation of other components of the sensor calibration apparatus 805, performs any necessary calculations and executes any necessary programs for implementing the process of the sensor calibration apparatus 805 and its individual components, and controls the flow of data between other components of the sensor calibration apparatus 805 as needed.

Within the sensor calibration unit 810, the first test pattern provider device 820 provides a first test pattern having a series of bars, where for each bar, the sensor calibration unit 810 knows the ideal centroid location of the bar. The first test pattern can consist ladder charts printed out for a known period. As can be seen in FIG. 6, the ladder chart test pattern has alternating levels of light and dark images spaced out over a fixed distance. The pattern is considered a ladder chart because the light periods represent an "off" location in the image where the dark steps represent an "on" location in the image, similar to an alternating square wave graph pattern. As mentioned above, the alternating light and dark patterns are spaced apart at a fixed distance. For example, the system can print out a 5 cycle/mm ladder chart which would have a period of 200 μm for each alternating light and dark portion.

After the first test pattern provider 820 provides the test pattern, the sensor calibration unit 810 will activate the image reading sensors 830 to read the test pattern. Although not limited to this embodiment, the image reading sensors 830 may be a full width array of sensors consisting of a series of chips butted together to form a defined process width. In exemplary embodiments, the scan line average of the test pattern image results in a 1-D gray level profile across the sensor array. It should also be appreciated that, in an exemplary embodiment, the image reading sensors 830 are the same image reading sensors 835 that are placed in the printhead calibration unit 860.

Once the image reading sensors 830 starts reading the test pattern, the sensor calibration unit 810 will calculate the signature error of each sensor using the signature error calculating unit 840. For each ladder of the test pattern, the signature error calculating unit 840 will perform an iteration of steps for i=1 to n iterations. Starting with the first ladder (i=1), the signature error calculating unit 840 will compute the centroid location of the ladder.

In an exemplary embodiment, the centroid is calculated by printing out a sample ladder chart test pattern having alternating light and dark portions creating a reflective profile. The sensors will then read the center portions between each rising and falling edge of each alternating light and dark pattern. The centroid location is there area closest to the center of either the light portion or the dark portion. In its most simple embodiment, the centroid will be the exact center portion of the light or dark portion of the ladder chart pattern. However, due to the sensor signature error of the image reading sensors, the centroid location read in by each sensor may be off by several μms. In some cases, the centroid readings were found to be off center anywhere in the range of ±20 μm.

After the signature error calculating unit 840 calculates the centroid position of the ladder, the signature error calculating unit 840 can calculate the error of the sensor relative to the ideal position of the ladder test pattern. The signature error calculating unit 840 calculates the error using the equation $E(i)=X(i)-(i-1)*dX$. E(i) is the error amount that the particular sensor is off from the ideal position. In essence, E(i) is actually the calculated signature for the particular sensor. X(i) is the position of the centroid read in by the sensor. The portion of the equation, $(i-1)*dX$ denotes the location of the previous iteration, (i−1), times a constant dX which is the period of distance between the test bars. In an exemplary embodiment, dX is 200 μm. As such, the positional error E(i) is calculated by the actual position X(i) minus the previous iteration, (i−1), times a constant dX.

After the positional error is calculated for a particular iteration, the signature error calculating unit 840 will simply determine if the number of iterations has reached its finish at n. If i=n, the sensor calibration unit 810 will create the signature error look-up table 850, otherwise the sensor calibration unit 810 will continue the process of signature error calculation.

Once the system has computed the relative positional error for each sensor at every ladder position, the sensor calibration unit 810 will create a signature error look-up table 850, SIG_LUT, that may be constructed at N-pixel intervals for each image-reading sensor in the array. As such, the signature error profile will encompass every pixel in the sensor, and SIG_LUT will contain the sensor signatures for every sensor in the sensor array. For example, one full width array sensor alone may have 13392 values for the pixels in the full width array sensor. After the signature error look-up table is created, the image processing apparatus no longer utilizes the sensor calibration unit 810, and in operation, uses the print head calibration unit 860 to calibrate an array of print heads. It should be appreciated that in an exemplary embodiment, after the signature error look-up table 850 ($SIG_{13}$ LUT) is created, the signature error look-up table 850 is placed within the image processing unit 800 as the signature error look-up table 855 (SIG_LUT).

The print head calibration unit 860 will print out a test pattern using a second test pattern printer 865 consisting of a series of CMYK dashes to quantify x-direction, y-direction, and roll of the print head system. The test pattern is periodic in the cross-process direction in order to sample jets in the same row within a given print head. Printed dash pattern parameters, such as dash length and the number of repeated dashes may be dependent upon sensor contrast and noise. Other considerations, such as image size and ink usage are weighed when determining the optimization of the test pattern design.

After the test pattern is printed out by each of the print heads, the print head calibration unit 860 will scan the dashes using the image reading sensors 835 and determine the overall alignment and calibration of the individual print heads. For every dash scanned by the image reading sensor 835, the sensor determines the x-position of the dash. The x-position in an exemplary embodiment is along the x-axis (cross-process direction) and the y-position in an exemplary embodiment is along the y-axis (process direction).

The x-position of the dash may be in fractional pixels. As such, linear interpolation of the sensor signature from the SIG_LUT look-up table is required. For example, a sensor may read a pixel at position 74.5. However, the SIG_LUT look-up table is constructed for each pixel. Therefore, the print head calibration unit 860 would have to interpolate the error at pixel 74 and at pixel 75 to determine the signature error for pixel 74.5. The x-position at a given pixel is represented by $x_{dash}$.

After the print head calibration unit 860 determines $x_{dash}$ for a particular dash, the print head calibration unit 860 will access SIG_LUT for each pixel, and, as explained above, in some instances using linear interpolation, will determine the amount of error of the given image reading sensor 835 to help determine the appropriate calibration for a particular print head. The amount of error at a given pixel is denoted by $e_{dash}$. The value of $e_{dash}$ is the amount in which the given sensor is misreading the pixel alignment at a particular location. In essence, it is the sensor's signature for that particular value. As such, the print head calibration unit 860 can correct for the misreading of the image reading sensor 835 by simply adjusting for $e_{dash}$.

Once the print head calibration unit 860 determines $e_{dash}$ for a given pixel, the print head calibration unit 860 will adjust for the image reading sensor's signature by offsetting $x_{dash}$ by the error value in $e_{dash}$. As such, the print head calibration unit 860 will determine $x_{dash\_corrected}$ by using the equation $x_{dash\_corrected}=x_{dash}-e_{dash}$. The print head calibration unit 860 continues this process until all print heads have been properly calibrated. Once calibrated, stepper motors provided in association with the print head may be adjusted accordingly to refine the x-position, y-position, and roll of each unit to achieve calibration.

It will be appreciated that various of the above-disclosed and other features and functions, or alternatives thereof may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for calibrating print heads to account for signature error of an image reading sensor, the method comprising:

providing a first test pattern having a series of bars, the bars having known centroid locations;

reading each bar of the first test pattern using the image reading sensor;

computing the centroid location of each bar pattern using the sensor;

calculating the signature error for each pixel in the image reading sensor by comparing the sensor read centroid location to the corresponding known centroid location;

creating a signature error look-up table containing the signature error for each pixel of the individual sensor at N pixel intervals;

printing a second test pattern having a series of dashes, each dash extending over a plurality of pixels;

determining a position of each dash in the test pattern using the image reading sensor to find a believed position of the print head;

accessing the signature error look-up table to find the signature error of the image reading sensor for the pixels located within each dash; and correcting the position of the print head by subtracting the signature error of the sensor at each pixel location from the believed position of the print head.

2. The method of claim 1, wherein the signature error of the image reading sensor for a fractional pixel in the second test pattern is calculated using linear interpolation.

3. The method of claim 1, wherein the series of dashes in the second test pattern is printed in color.

4. The method of claim 1, wherein the first test pattern has a series of ladder chart bars.

5. The method of claim 1, wherein the image reading sensor is part of a full width array sensor having a series of chips butted together to form a specific process width.

6. The method of claim 1, wherein the positional error calculated for each pixel in the image reading sensor operates for n iterations where i=1 iterations to n iterations, and n is the maximum number of bars in the first test pattern.

7. The method of claim 6, wherein the positional error calculated for each pixel in the image reading sensor is represented by the equation $E(i)=X(i)-(i-1)*dX$ where $E(i)$ represents the signature error of the image reading sensor, $X(i)$ is the read position of the centroid, and $(i-1)*dX$ is the location of the previous iteration times a constant dX where dX is a period of distance between the dash patterns.

8. A printing apparatus, comprising:

a test pattern provider that provides a first test pattern having a series of bars, the bars having known centroid locations;

an image reading sensor that reads each bar of the first test pattern and computes a centroid location of each bar pattern;

a signature error calculation part that calculates the signature error of each pixel in the image reading sensor by comparing the sensor read centroid location to the corresponding known centroid location;

a signature error look-up table containing the signature error for each pixel in the individual sensor at N pixel intervals; and a print head calibration part that prints a second test pattern having a series of dashes, each dash having a plurality of pixels, determines a position of each dash in the test pattern using the image reading sensor to find a believed position of the print head, accesses the signature error look-up table to find the signature error of the image reading sensor for the pixels located within each dash, and corrects the position of the print head by subtracting the signature error of the sensor at the pixel locations from the believed position of the print head.

9. The printing apparatus of claim 8, wherein the signature error of each pixel in the image reading sensor for a fractional pixel in the second test pattern is calculated using linear interpolation.

10. The printing apparatus of claim 8, wherein the series of dashes in the second test pattern is printed in color.

11. The printing apparatus of claim 8, wherein the first test pattern has a series of ladder chart bars.

12. The printing apparatus of claim 8, wherein
the image reading sensor is part of a full width array sensor having a series of chips butted together to form a specific process width.

13. The printing apparatus of claim 8, wherein
the positional error calculated for each pixel in the image reading sensor operates for n iterations where i=1 iterations to n iterations, and n is the maximum number of bars in the first test pattern.

14. The printing apparatus of claim 13, wherein
the positional error calculated for each pixel in the image reading sensor is represented by the equation $E(i)=X(i)-(i-1)*dX$ where $E(i)$ represents the signature error of the pixel in the image reading sensor, $X(i)$ is the read position of the centroid, and $(i-1)*dX$ is the location of the previous iteration times a constant dX where dX is a period of distance between the dash patterns.

15. A printing system, comprising:
a sensor calibration device having:
- a test pattern provider that provides a first test pattern having a series of bars, the bars having known centroid locations;
- an image reading sensor that reads each bar of the first test pattern and computes a centroid location of each bar pattern;
- a signature error calculation part that calculates the signature error of each pixel in the image reading sensor by comparing the sensor read centroid location to the corresponding known centroid location; and
- a signature error look-up table containing the signature error for each pixel in the individual sensor at N pixel intervals; and a print head calibration device having:
- a print head calibration part that prints a second test pattern having a series of dashes, each dash having a plurality of pixels, determines a position of each dash in the test pattern using the image reading sensor to find a believed position of the print head, accesses the signature error look-up table to find the signature error of the image reading sensor for the pixels located within each dash, and corrects the position of the print head by subtracting the signature error of the sensor at the pixel locations from the believed position of the print head.

16. The printing system of claim 15, wherein
the signature error of each pixel in the image reading sensor for a fractional pixel in the second test pattern is calculated using linear interpolation.

17. The printing system of claim 15, wherein
the positional error calculated for each pixel in the image reading sensor operates for n iterations where i=1 iterations to n iterations, and n is the maximum number of bars in the first test pattern.

18. The printing system of claim 15, wherein
the positional error calculated for each pixel in the image reading sensor is represented by the equation $E(i)=X(i)-(i-1)*dX$ where $E(i)$ represents the signature error of the pixel in the image reading sensor, $X(i)$ is the read position of the centroid, and $(i-1)*dX$ is the location of the previous iteration times a constant dX where dX is a period of distance between the dash patterns.

* * * * *